April 13, 1965 — J. PERKINS — 3,177,856

INTERNAL COMBUSTION ENGINE

Filed Jan. 27, 1964 — 2 Sheets-Sheet 1

INVENTOR.
JOE PERKINS

BY *Wm. R. Price*

ATTORNEY

April 13, 1965     J. PERKINS     3,177,856

INTERNAL COMBUSTION ENGINE

Filed Jan. 27, 1964     2 Sheets-Sheet 2

INVENTOR
JOE PERKINS

BY *Wm. R. Price*

ATTORNEY

United States Patent Office 3,177,856
Patented Apr. 13, 1965

3,177,856
INTERNAL COMBUSTION ENGINE
Joe Perkins, 1614 Jaeger Ave., Louisville, Ky.
Filed Jan. 27, 1964, Ser. No. 340,159
6 Claims. (Cl. 123—68)

This invention relates to improvements in internal combustion engines.

Most engines as known today fire near or just before the piston reaches top dead center so that practically all of the force of the charge is expended before the crank is in the proper angular position to exert maximum leverage on the crank shaft. This is due to the fact that the principal force of the charge of the explosion in the cylinder is expended before the crank has reached the proper angular position to exert maximum torque on the crank shaft.

In order to overcome this difficulty, some engines have been designed to fire after the piston has passed top dead center so that the crank is in a more advantageous position to exert leverage on the crank shaft. However, it has been found in many instances that the force of the explosion diminishes rapidly as the piston travels downward so that the maximum power of the explosion is expended too early to furnish maximum power during the time when the crank is in its most advantageous position to transmit most of the power to the crank shaft. This is due partially to the fact that the quantity of the charge is limied in the combustion chamber at the time of firing thereof. Another factor is the quantity of air in the charge at the time of firing. Thus, in most engines sufficient air is not furnished at high speeds to produce a well balanced charge of air and fuel and, as a consequence, as speed increases it is necessary to increase the quantity of fuel in proportion to the quantity of air in the charge in order to maintain power and speed. Some engines utilize blowers or superchargers in order to increase the air or air and fuel mixture in the combustion chamber. In some instances, several carburetors or carburetor jets have been utilized to increase the quantity of fuel in the charge. In any event, if less air is available at the time of firing, more fuel is required to maintain power and speed.

The power which is developed by an engine depends on the volume and proper proportion of air and fuel in the charge, the proper compression of the charge at firing time, the area of the top of the power piston and the relative position of the crank to the crank shaft. It is also important to utilize a stationary cylinder head so as to prevent dissipation of power in the power cylinder during the power stroke of the piston.

It is an object of this invention to provide an engine whereby maximum compression can be developed in the power stroke.

Another object of this invention is the provision of a means whereby sufficient quantities of air and fuel are properly proportioned for the charge over a wide range of power and speed.

Still another object of this invention is the provision of an engine whereby ignition takes place at the proper degree past top dead center so that maximum leverage on the crank is obtained during the principal part of the power stroke.

Another object of this invention is the provision of an engine whereby the products of combustion are completely scavenged from the power cylinder so as not to dilute the next charge, to prevent pre-ignition of the next charge, and to facilitate cooling of the engine.

The engine of this invention is of the two cycle type which comprises a two cylinder unit in which all valves are actuated by the crank shaft and in which the pistons in both cylinders are connected to the same crank shaft. Both pistons travel all the way to the cylinder heads of their respective cylinders thus leaving no free space within the cylinder above the piston when either of the pistons is at top center position. This engine unit utilizes a larger cylinder for intake and compression and a smaller power cylinder. The compression cylinder ordinarily will have a capacity of about four times that of the power cylinder in order to draw in, compress and transfer a sufficiently large charge at a sufficiently high compression for the power cylinder. The power piston in the power cylinder travels several degrees ahead of the compression piston as, for example, about 35 degrees so that the power piston crank will be in an advantageous angular position to transmit maximum leverage on the crank shaft during the entire power stroke. The design of this engine unit is made possible by use of specially designed transfer valves equipped with compression rings, which permits the transfer of the charge under compression from the large cylinder to the small cylinder without any loss of charge or compression during the transfer. In one embodiment, twin transfer valves equipped with compression rings on the valve stems are utilized. In another embodiment, specially designed slide valves are utilized which are in rubbing contact with compression rings. In either event, the cylinders are completely closed from each other except for the period in which the charge is transferred. The intake valve opens to the larger compression cylinder just as the piston passes over top center and remains open until the piston reaches bottom center when it closes, causing a full intake of charge. The piston compresses the charge on its return or inward stroke until the piston rises to within about 35° of top center when the transfer valve opens the passage for the transfer of the charge to the power cylinder. The charge is transferred between this point and the time the compression piston reaches top center position when the top of the compression piston is against the cylinder head. At this time, the transfer valve closes, and during that time of the transfer of the charge, the compression continues to rise in the power cylinder. The charge is compressed to the highest permissible point when it all reaches the power cylinder. Due to the position of the compression piston against the cylinder head, all of the charge is transferred from the compression cylinder to the power cylinder leaving no residue in the compression cylinder.

The transfer of the charge is made from the time the power piston is at top center position against the cylinder head, at which time the exhaust valve closes, and the transfer valve opens, until the power piston travels outward or downward about 35°, when the transfer valve closes and the charge is fired. The charge is transferred to the very restricted cavity left by the outward travel of the power piston from the cylinder head to the firing position and into which an ample volume of air or of air and fuel for this space has been transferred and at sufficiently high compression when fired to exert an enormous force over the piston head at the time the piston rod and crank are in the most favorable position to exert the most turning power on the crank shaft. The restricted space in the power cylinder at firing time, together with space left by further outward travel of the power piston on power stroke, furnishes less room for the expansion of the fired charge, thereby putting more pressure over top of power piston for the whole length of the power stroke.

The exhaust valve opens when the power piston has reached or is very near the bottom center position and remains open until the piston reaches top center position against the cylinder head when it closes. This completely forces out all of the burned gases leaving no residue in the cylinder. It is within the scope of this invention to provide an additional exhaust port in the lower portion of the power cylinder at a level with the top of the power piston when it is at bottom center position.

This arrangement furnishes more power at low speeds as well as at high speeds, and is effective with any length power stroke, but is especially effective with a comparatively long power stroke. When the slide valves are used as described and positively operated by eccentrics on the crank shaft higher speeds may be obtained than by an engine using poppet valves with springs. This engine has few working parts, no gears or chains, and all parts work freely with very little internal friction. It is easily lubricated and cooled, and is adaptable for use where any power is needed. Any number of units may be used to make up an engine, and they may be arranged in several different manners.

The invention will be better understood by referring to the attached drawings in which.

FIGS. 6A through F are a series of schematic views illustrating the position of the slide valves relative to the top dead center position of the power piston and to the port relative to the positions of the power and compression pistons.

Figures 7, 8:
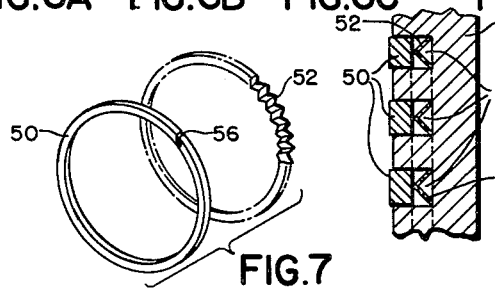

FIG. 7 is a perspective view of a compression ring and a corrugated compression spring adapted for use with the slide valve assemblies of my invention.

Figure 5:
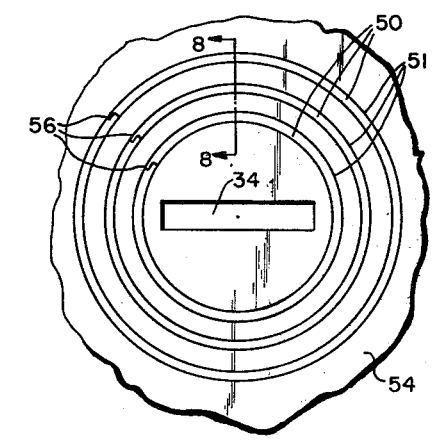
FIG. 5 is an exploded fragmentary view of the interior face of the slide valve plate and of the smooth outside surface of a cylinder wall against which the slide valve works illustrating the relation of the compression rings to the port.

FIG. 8 is a section taken along lines 8—8 of FIG. 5 illustrating the relation of the compression ring and compression spring in the compression ring grooves of the slide valve cover plate and of the smooth outside surface of a cylinder wall against which the slide valve works.

Figure 1:
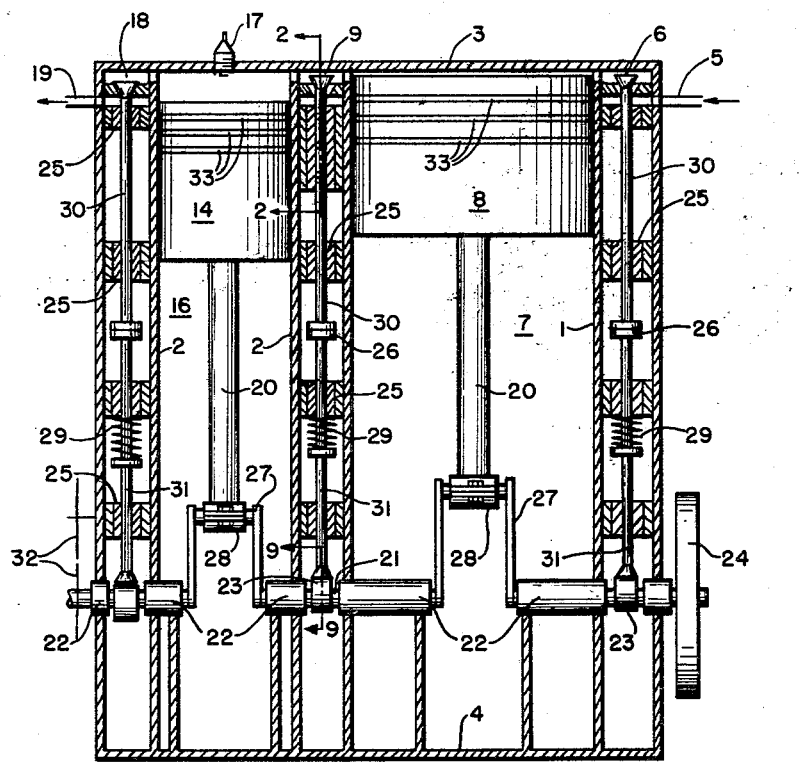
FIG. 1 is a vertical longitudinal section illustrating an engine unit.
Figure 9:
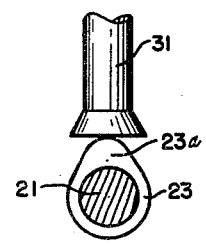

FIG. 9 is a transverse section taken along lines 9—9 of FIG. 1 which illustrates the action of the cam in lifting valve stem push rods upon revolution of the crank shaft.

Figure 2:
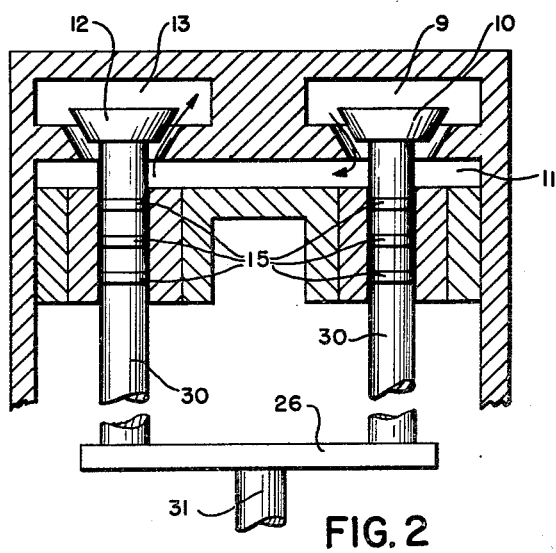
FIG. 2 is a transverse vertical section taken along lines 2—2 of FIG. 1 illustrating an arrangement of twin valves of the poppet type which are actuated by a single cam on the crank shaft.

Referring now to FIG. 1, the compression cylinder 7 consists of compression cylinder walls 1, piston 8 equipped with piston rings 33. Intake and compression piston 8 is connected by connecting rod 20 to connecting rod bearings 28 via cranks 27 to crank shaft 21 which is journaled in crank shaft bearings 22. The compression cylinder 7 shares a common cylinder head 3 with power cylinder 16 as well as a common base 4. Power piston 14 equipped with piston rings 33 is connected to the crank shaft 21 so as to transmit power by means of connecting rod 20, connecting rod bearings 28 and cranks 27 and operates in cylinder 16 inside cylinder wall 2. The fuel and air intake 5 from carburetor (not shown) travels through intake valve 6 to the compression cylinder 7. The twin transfer valves 10 and 12 communicate with the compression cylinder 7 by intake opening 9. As is best shown in FIG. 2, the flow of the compressed charge is through intake 9 through valve 10 to twin valve passage 11 and through valve 12 and through the valve outlet opening 13 to firing cylinder 16. Each of the transfer valves 10 and 12 are equipped with a valve stem 30 containing compression rings 15. Each of the valve stems are equipped with bushings 25 and valve stem adjustment 26 in the conventional manner. The valves are held shut by springs 29 attached to valve stem push rods 31. A series of valve stem push rods 31 are positioned over cams 23 contained on the crank shaft 21 which operate to open the valves against the spring members responsive to the position of the crank shaft 21. Connected to the end of the crank shaft 21 is flywheel 24 which stores the inertial energy of the crank shaft in a conventional manner.

In operation the charge of air or air and fuel is taken in cylinder 7 through intake 5 and intake valve 6 by reason of the low pressure resulting from the downward stroke of compression piston 8. At the end of said stroke intake valve 6 closes due to the revolution of cam 23 in such a manner that the lobe portion 23a passes out of contact with valve stem push rods 31. The return stroke of piston 8 compresses the charge and as firing piston 14 starts its downward stroke in firing cylinder 16, the lobe portion 23a of cam 23 pushes the twin valves 10 and 12 against the biasing pressure of spring 29 so that both open simultaneously, thus permitting the charge to pass through opening 9 and through valve 10 to passage 11 and through valve 12 and out through port 13 into firing cylinder 16. Compression rings 15 on valve stems 30 prevent any leakage of charge or of compression during transfer of the charge from compression cylinder 7 to firing cylinder 16. The twin valves 10 and 12 are held open and compression continues to raise until piston 8 reaches top dead center so that the compressed charge is completely transferred to power cylinder 16 at the time piston 14 has reached firing position. At this time, transfer valves 10 and 12 close and as exhaust valve 18 is also closed, the charge is ignited by spark plug 17 forcing the piston 14 down. It will be noted that there is no communication between compression cylinder 7 and power cylinder 16 except during the actual time of the transfer of the charge. At the end of the downward stroke of power piston 14 the revolution of cam 23 causes exhaust valve 18 to open, thus allowing burned gases to escape through exhaust 19 and release the pressure on the piston 14. The exhaust valve 18 remains open until firing piston 14 reaches top dead center, thus completely scavenging the power cylinder 16 of all exhaust gases. At this point, the exhaust valve 18 closes.

The power piston 14 actuates the crank shaft 21 through connecting rod 20 and rod bearing 28 and crank 27. In turn, the crank shaft 21 actuates intake and compression piston 8 through crank 27 and connecting rod bearing 28 and connecting rod 20. As previously indicated, crank shaft 21 is journaled in bearings 22 and has a flywheel 24 at one end and a timer 32 at the other which operates from the crank shaft.

All the valves are operated by cams 23 attached to crank shaft 21 and through valve stem push rods 31 and valve stems 30 supported through bushings 25. An adjustment 26 and coil spring 29 is provided for each valve stem 30 and valve stem push rods 31 to hold its respective valve shut when it is not activated by the lobe 23a of the respective cams 23.

Figures 3, 4:
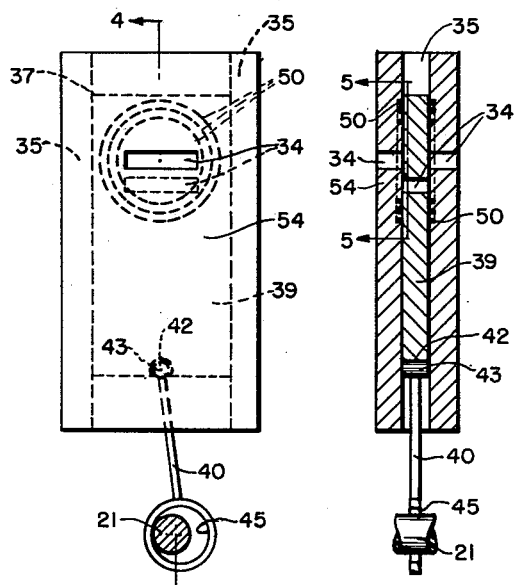
FIG. 3 is an end view of a specially modified cylinder and slide valve actuated by an eccentric off of the crank shaft.
FIG. 4 is a sectional view taken along lines 4—4 of FIG. 3 illustrating the slide valve assembly and plate in relation to the cylinder wall.

In another modification of my invention, specially designed slide valves are utilized instead of the poppet valves illustrated in FIGS. 1 and 2. Referring now specifically to FIGS. 3 and 4, the slide valve 39 is actuated by an eccentric 45 on crank shaft 21. The slide valve 39 is a flat plate containing two smooth faces and containing a port 34. Eccentric rod 40 is connected to the slide valve 39 through a disc 43 fitting into a socket 42 on the slide valve 39.

The smooth face of the slide valve moves against a smooth machined surface on the exterior wall 1 of the compression cylinder. Two raised flanges 35 are provided on the exterior wall of the surface which in combination with the slide valve cover plate 54 forms a closed passage in which slide valve 39 can reciprocate.

The slide valve 39, cylinder wall 1, and slide valve cover plate 54 are each equipped with a port 34 so that when the ports on each part of the assembly register with each other, a charge may be transferred into the cylinder. Surrounding the port on the cover plate 54 and on the cylinder wall 1 are a series of compression grooves 51 into which compression spring 52 and compression ring 50 (Fig. 7) are fitted. The compression spring is a corrugated thin metal spring which tends to push the compression ring against the smooth surface of the slide valve 39 (FIG. 8). The compression ring 50 is split at 56 to facilitate placing same into position into the compression groove 51. In this manner, the compression rings 50 located both on the smooth surface of the cylinder wall surrounding port 34 and on the interior face of the cover plate 54 continually push against the smooth surfaces of the slide valve to prevent loss of compression or loss of the charge during transfer of same.

FIGS. 6A through F schematically illustrate the operation of the slide valves 39 relative to the position of the compression piston 8 and the power piston 14. In these figures, line 37 illustrates top dead center position for the power piston 14 and the compression piston 8 and the top of port 34 in the cylinder walls and plate 54. Line 34 schematically illustrates the bottom of the port 34 in the respective cylinder walls and in the slide valve cover plate 54.

Figures 6A, 6B, 6C, 6D, 6E, 6F:
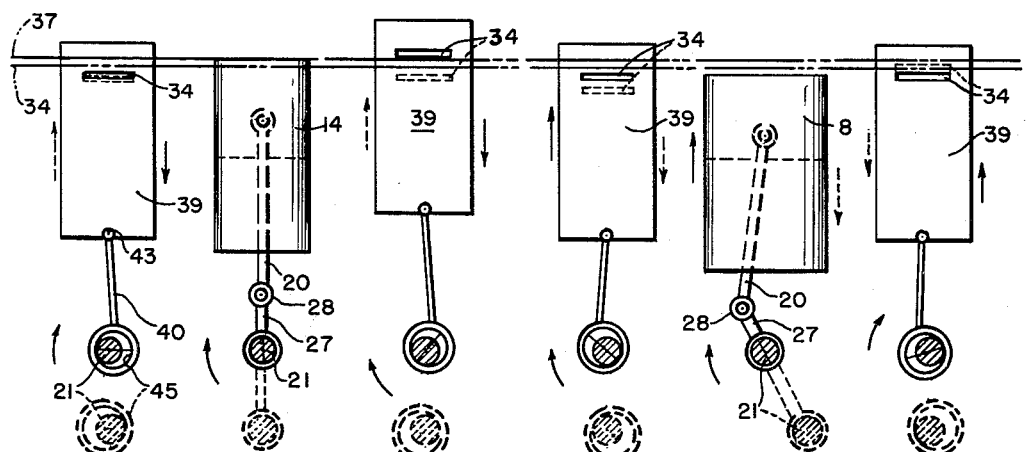

It will be noted in FIG. 6B that power piston 14 is illustrated in full lines as being at top dead center and in dotted lines as being at bottom dead center. The position of the slide valves and their eccentrics 45 are illustrated in full lines relative to the position of the power piston at top dead center 37 and in dotted lines relative to the position of the power piston at bottom dead center. The direction of travel is illustrated in full lines to correspond with the position of the eccentric 45 on crank shaft 21 and in dotted lines to correspond with the position of the eccentric 45 illustrated in dots below the main illustration.

The summit of the eccentric 45 for intake valve 39 illustrated in FIG. 6F is set at about 90 degrees lag of compression piston 8 or at about 125 degrees lag of power piston 14 when the power piston 14 is at top dead center 37. Intake port 34 thus opens as compression piston 8 starts its downstroke and stays open until compression piston 8 reaches its bottom position. Thus, as is shown in dots in FIG. 6F, the valve 39 is about to close as compression cylinder 8 approaches the bottom dead center position. In this manner, port 34 opens quicker and stays open for the full piston stroke to close as the compression piston 8 reaches its bottommost position. In the position shown in full lines in FIG. 6F, slide valve 39 has reached approximately the center of its stroke and is traveling at a faster speed both when port 34 opens and when port 34 closes.

The compression piston 8 illustrated in full lines in FIG. 6E lags about 35 degrees behind the power piston 14 and is on the upstroke.

The slide valve 39 illustrated in FIG. 6D which is used for transfer of the charge and which is located next to the compression piston 8 is illustrated in full lines as on its upstroke with the summit of the eccentric 45 at about 45 degrees or more lag of power piston 14. This valve has traveled near three-fourths of its upstroke and port 34 is ready to open.

The slide valve 39 illustrated in FIG. 6C which is located next to the power piston 14 is on its downstroke with the summit of eccentric 45 about 45 degrees or more in advance of power piston 14. This valve has traveled about one-fourth or more of its downstroke and port 34 is ready to open. The ports in the two slide valves illustrated in FIGS. 6C and 6D meet to register with ports 34 in cylinder walls 1 and 2 and in cover plate 54 to open ports 34 only during transfer of the charge. Thus, the port is closed as soon as transfer of the charge has been completed. The ports in these two valves, 6C and 6D, are below ports 34 in the cylinder walls 1 and 2 and cover plate 54 on their return strokes and do not register with each other to open a transfer passage at that time.

As illustrated in FIG. 6B, power piston 14 is at top dead center 37 so that transfer of the charge from compression cylinder 7 will start as power piston 14 starts its downstroke.

The summit of the eccentric 45 for the exhaust valve 39 illustrated in FIG. 6A is set about 90 degrees in advance of power piston 14. Exhaust port 34 opens as power piston 14 starts its upstroke and stays open until power piston 14 reaches its top position 37 when port 34 closes. Thus, port 34 opens quicker and stays open for the full piston stroke and quickly closes as power piston 14 reaches top dead center. The valve 39 illustrated in full lines in FIG. 6A having just closed port 34 has reached approximately the center of its stroke and is traveling at a faster speed.

It will be appreciated that the slide valves illustrated herein could be operated by cams on the crank shaft according to the method previously described and illustrated in FIGS. 1 and 2. In this event, the timing and the operation of said valves would be identical to that illustrated for the twin poppet valves. In that event, either one or two slide valves could be used for transfer of the charge from the compression cylinder 7 to the power cylinder 16. This could eliminate the cover plate 54 and make use of the smooth surfaces of the respective cylinder walls 1 and 2 of the compression cylinder and power cylinder, respectively, if only one slide valve is used. Many other modifications will occur to those skilled in the art and the specific embodiments illustrated and described are intended to be illustrative in nature and non-limiting except as to be commensurate in scope with the appended claims.

I claim:

1. An internal combustion engine comprising:
   (a) a power cylinder assembly which includes,
      (i) a power cylinder having a smooth head,
      (ii) a power piston having a smooth top conforming to the area of the cylinder head and fitted for reciprocation in said power cylinder between top dead center against the cylinder head, and bottom dead center, said piston having a firing position on the outward stroke several degrees past top dead center,
      (iii) a restricted space in said power cylinder forming a firing chamber, said firing chamber constituting the space between the cylinder head and the top of the power piston at firing position of said power piston,
      (iv) an exhaust port on one side in proximity to the top of the cylinder wall and a transfer port on the other side in proximity to the top of the cylinder wall,
   (b) a compression cylinder assembly which includes,
      (i) a compression cylinder having a smooth head located adjacent to said power cylinder and having a larger capacity than the power cylinder,
      (ii) a compresison piston having a smooth top conforming to the area of the cylinder head and fitted for reciprocation in said compression cylinder between top dead center, against the cylinder head and bottom dead center,
      (iii) an intake port on one side in proximity to the top of the cylinder wall and a transfer port on the other side in proximity to the top of the cylinder wall, said transfer port being adjacent to the power cylinder,
   (c) a transfer passage connecting the transfer ports in said power and compression cylinders and transfer valve means which keep said passage closed all the time except for the period of the transfer of the charge under compression from said compression cylinder to said power cylinder,
   (d) a crank shaft operatively connected by a first crank means to said power piston and by a second crank means to said compression piston so that the first crank means is angularly advanced in respect to said second crank means so as to exert maximum leverage on said crank shaft when said power piston is on power stroke, (e) an intake valve means responsive to the position of said compression piston so as to open said intake port as the piston starts on its down stroke and to close said intake port as the piston starts on its compression stroke, (f) said transfer valve means comprising two transfer valve members which are operative to open said transfer passage after said power piston has reached top dead center and starts its down stroke toward firing position and prior to said compression piston reaching top dead center on its up stroke and to remain open until said compression piston reaches top dead center against said cylinder head and thereafter closes, (g) exhaust valve means responsive to the position of the power piston to open said exhaust port when the piston is in proximity of bottom dead center and to remain open until said power piston reaches top dead center against said cylinder head so as to completely scavenge said cylinder and thereafter close as the power piston commences its down stroke.

2. An internal combustion engine as defined in claim 1 in which said transfer valve means comprises valve closure means and a plurality of compression rings associated therewith to prevent loss of compression during transfer of the compressed charge to the power cylinder, said transfer valve means being positively actuated by means on said crank shaft to open said transfer valve means in timed sequence.

3. An internal combustion engine as defined in claim 1 in which said transfer valve means comprises a double acting twin poppet valve including frustro-conical valve closure means, complementary valve seats, valve stems having grooves for provision of compression rings but otherwise being of uniform diameter, compression rings fitted into said grooves on said valve stems and spring biasing means for maintaining said valve closure means closed, in combination with means responsive to the revolution of said crank shaft for opening said valve closure means against the biasing pressure of said spring means in timed sequence during the period of transfer of a compressed charge from said compression cylinder to said power cylinder.

4. An integral combustion engine as defined in claim 1 in which the capacity of the compression cylinder is about four times that of the power cylinder.

5. An internal combustion engine as defined in claim 1 in which the intake and exhaust valve means includes:
  (a) a valve bearing surface formed by a smooth flat outside surface of the cylinder wall in the area of the port in combination with a flat valve plate having a smooth inside surface and a port in its upper portion which registers with the port in the cylinder wall,
    (i) said valve bearing surface having at least one groove surrounding each of said ports and a compression spring and compression ring fitted into each of said grooves,
  (b) a flat slide valve member fitted for reciprocation in said bearing surface so that each face of said flat slide valve member is in rubbing contact with at least one compression ring,
    (i) said flat slide valve member having a port in its upper portion,
  (c) power means in operative relation with said flat slide valve member to positively reciprocate same, including
    (i) an eccentric connected to the crank shaft and responsive to the revolution of said crank shaft to move said port of said flat slide valve member to register with the port of said plate and cylinder wall to open same and out of registry with said ports to close same in timed sequence.

6. An internal combustion engine as defined in claim 1 in which
  (a) the transfer passage includes a port in the upper portion of said compression cylinder wall, a port in the upper portion of said power cylinder wall, and a plate having a flat smooth surface on each side and located between said cylinders and containing a port which registers with the ports in said cylinder walls,
    (i) each of said cylinder walls having a smooth flat outside surface in the area of the port which cooperates with a smooth flat surface on each side of said plate to form a valve bearing surface,
    (ii) said valve bearing surface containing at least one groove and a compression spring and compression ring fitted into said grooves around each of said ports,
  (b) said transfer valve means including two flat slide valve members
    (i) each of said flat slide valve members being fitted for reciprocation against the valve bearing surface formed by said plate and said cylinder wall in such manner that said plate separates said members and so that at least one compression ring is in rubbing contact with each face of each of said flat slide valve members,
    (ii) each of said flat slide valve members having a port in its upper portion,
    (iii) power means operatively connected to each of said flat slide valve members, including
    (iv) an eccentric on said crank shaft which reciprocates each of said flat slide valve members in opposite directions so as to move the port of each slide valve member past the port of said cylinder wall and said plate in timed relation so as to quickly open said transfer passage only during the period of transfer of the compressed charge from the compression cylinder to the power cylinder without loss of compression and quickly close said transfer passage after said transfer.

References Cited by the Examiner

UNITED STATES PATENTS

| | | | |
|---|---|---|---|
| 1,312,730 | 8/19 | Horn | 123—188 |
| 1,372,216 | 3/21 | Casaday | 123—68 |
| 1,512,673 | 10/24 | Brequet | 123—68 |
| 1,911,991 | 5/33 | Cosby | 123—68 |
| 2,522,649 | 9/50 | Tenney | 123—70 |

FOREIGN PATENTS 26,612  12/08  Great Britain.

FRED E. ENGELTHALER, *Primary Examiner.*